(12) United States Patent
Hunter

(10) Patent No.: US 7,132,030 B2
(45) Date of Patent: Nov. 7, 2006

(54) METHOD OF MANUFACTURING A SKATEBOARD DECK

(75) Inventor: Edward Garnet Hunter, Toronto (CA)

(73) Assignee: Roarockit Skateboard Company, Toronto (CA)

( * ) Notice: Subject to any disclaimer, the term of this patent is extended or adjusted under 35 U.S.C. 154(b) by 51 days.

(21) Appl. No.: 10/187,820

(22) Filed: Jul. 3, 2002

(65) Prior Publication Data

US 2004/0003886 A1    Jan. 8, 2004

(30) Foreign Application Priority Data

Jul. 2, 2002    (CA)    ................................. 2390264

(51) Int. Cl.
*B32B 37/10*    (2006.01)

(52) U.S. Cl. .................. 156/245; 156/242; 156/285; 156/286; 156/221; 156/222; 264/319; 264/320; 264/553; 264/571; 264/101

(58) Field of Classification Search ............... 156/242, 156/245, 285–286, 382, 221–222; 280/87.042, 280/11.27; 264/319–320, 511, 553, 571, 264/101–102, DIG. 78; 428/535, 537.1; 144/256.1, 259, 270, 381, 349, 352
See application file for complete search history.

(56) References Cited

U.S. PATENT DOCUMENTS

| | | | | |
|---|---|---|---|---|
| 2,370,429 A | * | 2/1945 | Vidal | .......................... 114/357 |
| 2,487,223 A | * | 11/1949 | Cupery | .......................... 525/56 |
| 4,222,808 A | * | 9/1980 | Hale et al. | ................... 156/245 |
| 4,295,656 A | * | 10/1981 | Moore | .................... 280/87.042 |
| 4,471,710 A | * | 9/1984 | Brown | ......................... 114/357 |
| 4,975,311 A | * | 12/1990 | Lindgren | ..................... 428/156 |
| 5,806,704 A | | 9/1998 | Jamison | ...................... 220/212 |
| 6,182,986 B1 | | 2/2001 | Smith | ..................... 280/87.042 |
| 6,474,976 B1 | * | 11/2002 | Oami et al. | .................. 425/503 |
| 6,561,118 B1 | * | 5/2003 | Mead | ........................... 114/357 |
| 6,648,363 B1 | * | 11/2003 | Gordon | ...................... 280/610 |
| 2002/0144740 A1 | * | 10/2002 | Skeens et al. | .............. 137/845 |
| 2003/0196744 A1 | * | 10/2003 | Sicola | ........................ 156/214 |

FOREIGN PATENT DOCUMENTS

JP    8-10377    * 1/1996

* cited by examiner

*Primary Examiner*—Jessica Rossi
(74) *Attorney, Agent, or Firm*—Dimock Stratton LLP (firm; Jenna L. Wilson

(57) ABSTRACT

A skateboard deck and a method of manufacturing a skateboard deck is provided without requiring the use of industrial-grade machinery. Precut layers of veneer or other suitable material are coated with adhesive and stacked on a one-sided, negative-contoured mold and placed in a flexible-walled, airtight container from which the air is evacuated, so as to place pressure on the container and force the layers to conform to the contours of the mold. The air evacuation may be accomplished by means of a hand operated, non-electric vacuum pump.

11 Claims, 5 Drawing Sheets

METHOD OF MANUFACTURING A SKATEBOARD DECK

FIELD OF THE INVENTION

The present invention relates generally to the field of skateboards, and more specifically to a kit and method of manufacture of a skateboard deck.

BACKGROUND OF THE INVENTION

Traditionally skateboard decks, such as street decks, long boards, and luge boards, have been manufactured from hardwood veneer layers using industrial presses. These presses push two molds, a positive and a negative form, similar to the shape of a modem skateboard deck against a number of layers of veneer and glue. Once the glue has dried the molds are separated and the skateboard deck is removed, finished, and mounted on skateboard hardware.

It has been noted that avid skateboarders frequently break their skateboards in use, and require replacement decks, although the hardware portion (such as the trucks, including the wheels) are still in good condition. Some skateboarders also wish to customize their decks by building their own, or decorating the outer surfaces. However, at present skateboarders must either obtain a complete replacement skateboard, including hardware, which increases the cost of a replacement; or obtain a pre-manufactured deck, which is pre-shaped and pre-finished. Equipment such as the industrial press needed to manufacture a custom skateboard deck is typically inaccessible to the average skateboard user, who requires instead a less expensive, more accessible means of manufacturing a skateboard deck which may later be customized or finished and mounted on skateboard hardware.

SUMMARY OF THE INVENTION

Accordingly, the present invention provides a skateboard deck and a method of manufacturing a skateboard deck from a plurality of layers of veneer or other suitable material without the use of an industrial press or two-sided mold. A one-sided mold having a contoured surface is provided with a plurality of precut layers. The layers are stacked on the mold with an adhesive interposed between adjacent layers, and the mold and layers thus stacked are placed in a flexible-walled, air-impermeable environment. Air in the environment is evacuated until exterior pressure on the environment causes the layers to conform to the contours of the mold, and the adhesive is allowed to set before the layers are removed from the environment.

A feature of the invention is that the air may be evacuated by means of a hand operated, non-electric pump.

Still another feature of the invention is that alignment of the layers on the mold may be achieved by means of alignment pins mounted on the contoured mold surface which correspond to pre-drilled holes in the layers; or by means of an elastic or tie restraint.

Another feature of the invention is a kit for the manufacture of a skateboard deck using this method, comprising the precut layers, a flexible-walled, air-impermeable environment with valve means for evacuating air, and a one-sided, contoured mold.

Yet another feature of the invention is a skateboard, comprising a deck manufactured using this method mounted on appropriate skateboard hardware.

BRIEF DESCRIPTION OF THE DRAWINGS

In drawings which illustrate by way of example only a preferred embodiment of the invention.

DETAILED DESCRIPTION OF THE INVENTION

Figure 1:
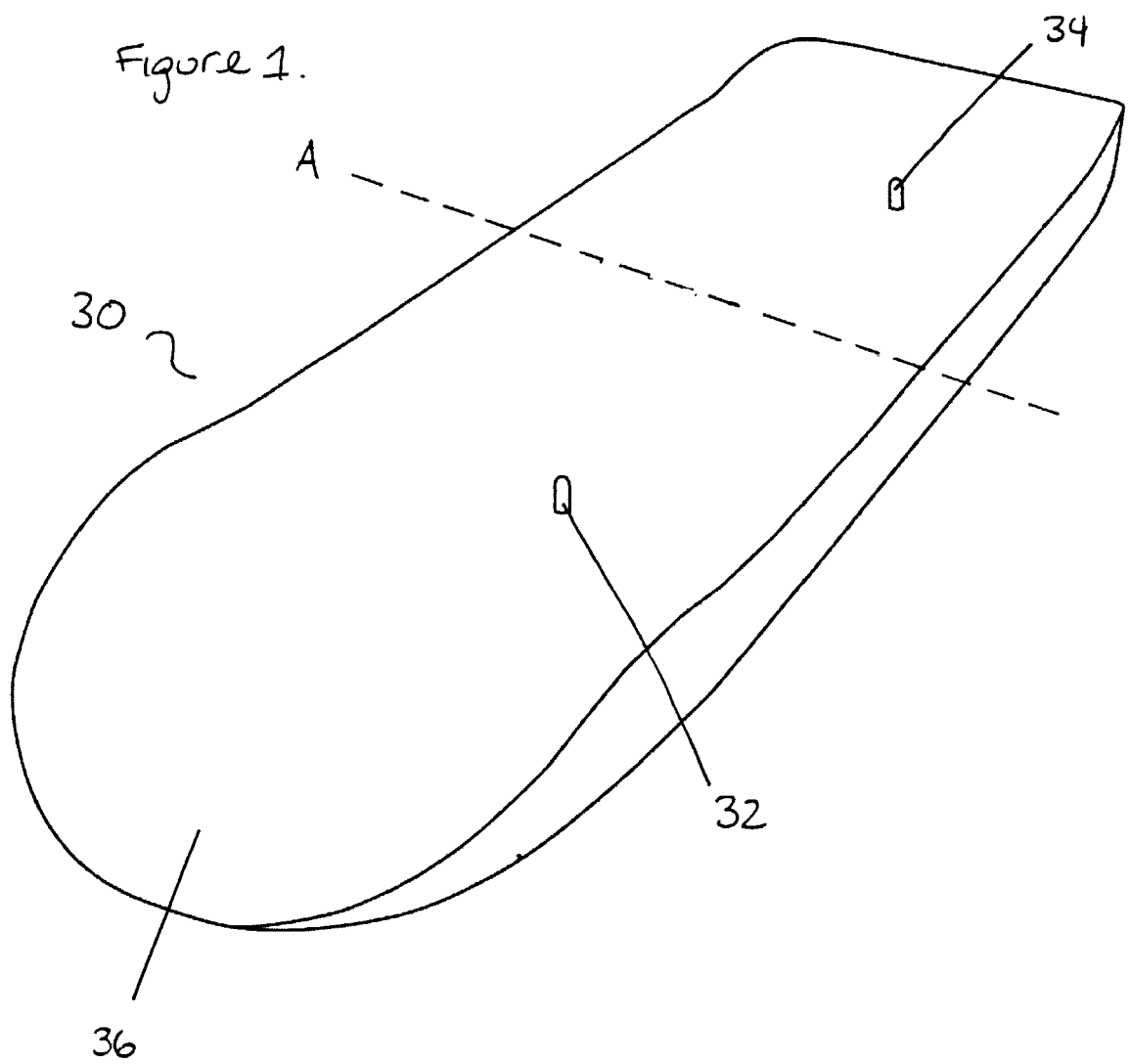
FIG. 1 is a perspective view of a preferred embodiment of the skateboard deck mold.

Referring to FIG. 1, the skateboard deck 10 (not shown in FIG. 1) of the present invention is manufactured with a one-sided mold 30. The mold 30 is shaped such that it generally follows the shape of the deck 10 to be manufactured. The upper surface 36 of the mold 30 is contoured as a negative of the finished skateboard deck 10 shape. To facilitate manufacture of the deck 10, a first and second alignment pin 32, 34 are mounted on the mold 30 such that they protrude from the upper surface 36.

In a preferred embodiment, the mold 30 is manufactured from a sturdy but lightweight material such as extruded, expandable, or closed cell polystyrene foam or high density urethane with sufficient density and rigidity such that it does not deform or break during the assembly of the deck 10. Such materials may be easily shaped to the form of the mold 30; extruded polystyrene foam, for example, may be cut to shape; expandable polystyrene and polypropylene may be injection or blow molded. Alternatively, the mold 30 may also be formed from molded pulp paper or plaster, or cut from balsa wood. However, with a material such as plaster, the mold 30 will then have a significantly greater weight. If the mold 30 is manufactured from a foam product, the alignment pins 32, 34 may be mounted in the mold 30 after the shape is formed; if the mold 30 is cast in a material such as plastic, paper, or plaster, the alignment pins 32, 34 are cast or mounted in the mold 30 before the material is set.

Figure 2:
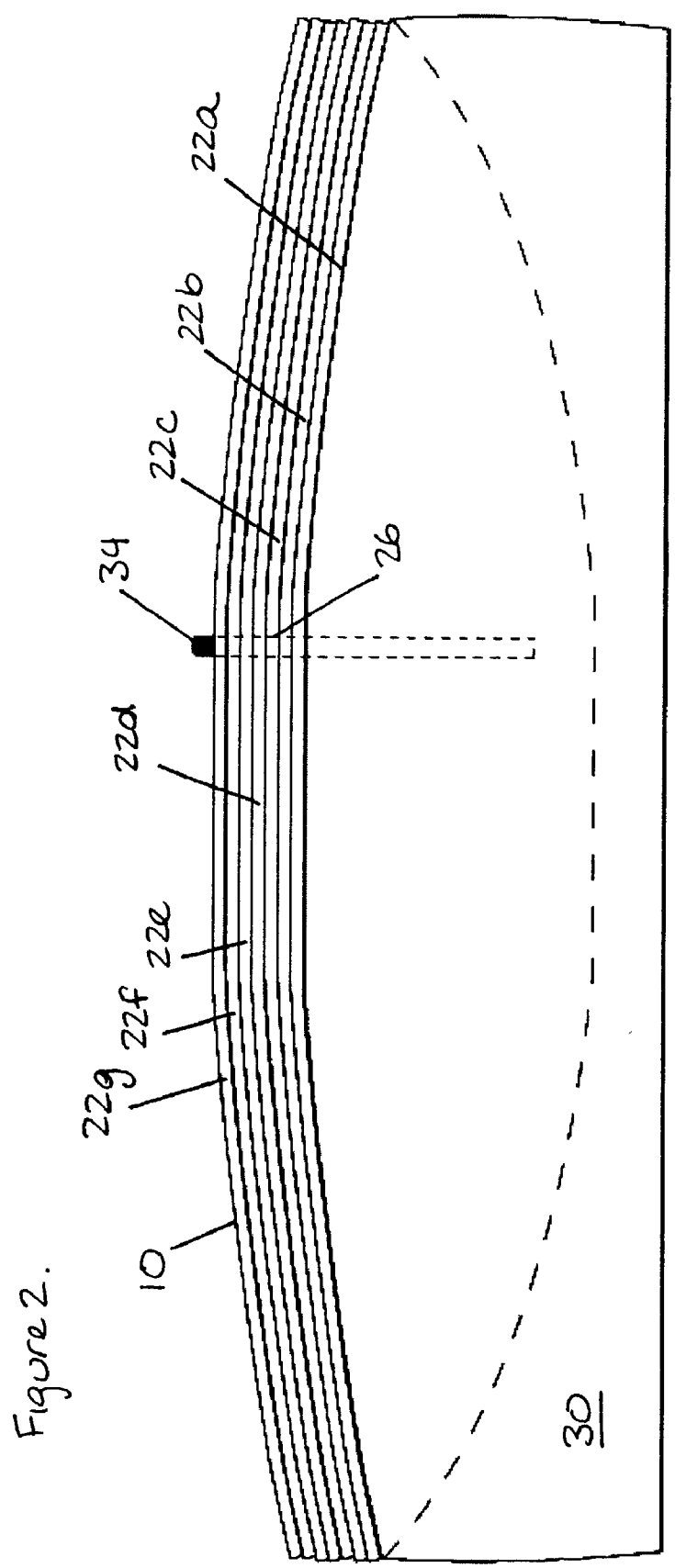
FIG. 2 is a cross-sectional view of diagram of a mold-layer assembly after air evacuation and adhesive setting from the axis A shown in FIG. 1.

Turning to FIG. 2, the deck 10 is composed of several layers of material 22a through 22g, comprising skate face, skate core, and x-band layers. Preferably the layers 22a through 22g are formed of rotary cut hard maple veneer. For strength and flexibility, preferably seven layers of 1/16" veneer are used to form the layers 22a though 22g, although fewer or more layers with other thicknesses may be used. The layers may also be composed of other materials such as other woods, bamboo veneer, aluminum, and composites such as carbon fiber. The layers, however, should be sufficiently thin so that the mold 30 is not distorted during the deck manufacturing process. Each of the layers 22a through 22g are precut with substantially similar shapes that correspond to a skateboard deck shape, as well as to the mold 30.

The outer skate face layers 22a, 22g are preferably cut from best quality veneer with no defects and, if cut from a wood, with the grain running in the lengthwise direction. The outer faces of the skate face layers 22a, 22g, which in the assembled deck 10 do not contact any other layers 22b through 22f, may optionally be finished with decorative markings after the deck 10 is assembled.

The skate face layers 22a, 22g sandwich an assembly of skate core layers 22b, 22d, 22f and x-band layers 22c, 22e. The skate core layers 22b, 22d, 22f are formed of lengthwise grain veneer and are alternated with the x-band layers 22c, 22e, cut from crosswise grain veneer. Where material with a grain is used, the crosswise grain of the x-band layers 22c, 22e provide strength to the assembled deck 10. The cosmetic quality of the interior layers 22b through 22f may be inferior to the cosmetic quality of the skate face layers 22a, 22g.

Each of the veneer layers 22a through 22g is provided with pre-drilled holes (not all shown) to facilitate mounting skateboard hardware after the deck 10 is assembled. The pre-drilled holes are aligned when the deck 10 is assembled. Two of the pre-drilled holes 24 (not shown) and 26 serve as alignment guides during assembly, and correspond to the alignment pins 32, 34 mounted on the mold 30.

In assembly, the layers 22a through 22g are adhered using a suitable adhesive for the deck material. In the preferred embodiment, a crosslinking polyvinyl acetate emulsion adhesive for high density hardwood veneer such as Multibond® SK8 from Franklin International, a two-part epoxy such as West System® epoxy, or a polyurethane adhesive is used such as GorillaGlue®. Adhesive is applied to the upper faces of each of layers 22a through 22f as they are each mounted on the mold 30 and over the alignment pins 32, 34. This mold-layer assembly is then inserted into the vacuum container 50, shown in FIG. 3.

The vacuum container 50 is preferably a bag formed of flexible nylon/polyethylene laminate or vinyl material and is of sufficient size to admit the insertion of the mold-layer assembly. The container 50 is initially sealed on all but one side to permit insertion of the mold-layer assembly. If the container 50 is manufactured from a roll of nylon/polyethylene laminate tubing, then one open end 54 may be heat sealed or otherwise sealed with an airtight seal. Once the mold-layer assembly is inserted in the container 50, the remaining open end 62 may be sealed using a removable, airtight clamp (described below), or using another means of achieving an airtight seal such as an adhesive tape or reclosable slide fastener.

The container 50 is also provided with an air evacuation aperture 56, to which is mounted in an airtight seal a one-way check valve means 60 for blocking the passage of air into the container 50. In one embodiment, tubing 58 is mounted at one end through the aperture 56 using an airtight adhesive and is connected at its other end to the valve 60.

Figure 3:
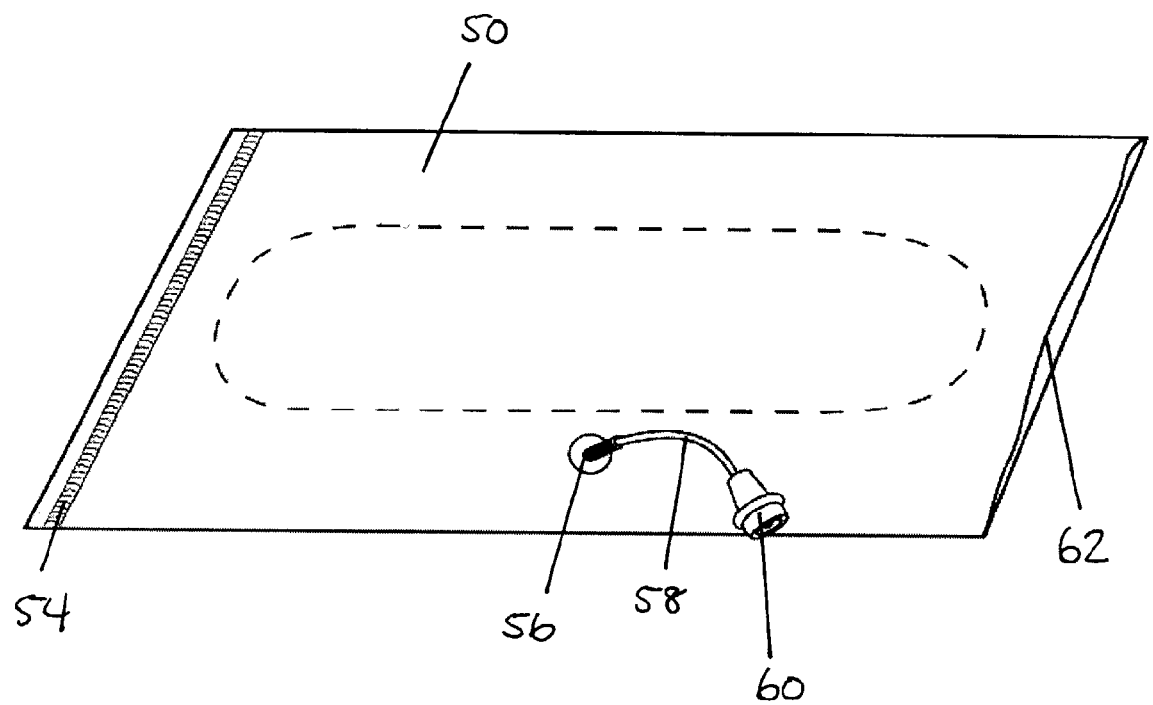
FIG. 3 is a perspective view of a preferred embodiment of the vacuum container and valve.

The aperture 56 is preferably positioned in the container 50 such that when the mold-layer assembly is inserted in the container 50 in the position delineated by the dotted line in FIG. 3, the aperture 56 disposed against the mold-layer assembly. Positioning of the aperture 56 against the mold-layer assembly permits air to be evacuated though the aperture 56, as described below, since the mold-layer assembly is somewhat porous. If the mold 30 is manufactured from a substantially non-porous material, such as plaster, then the side of the mold 30 may be scored to provide channels (not shown), or breather material may be interposed between the aperture 56 and the mold 30 (not shown) to permit the passage of air from within the container 50 through the aperture 56.

Figures 5A, 5B:
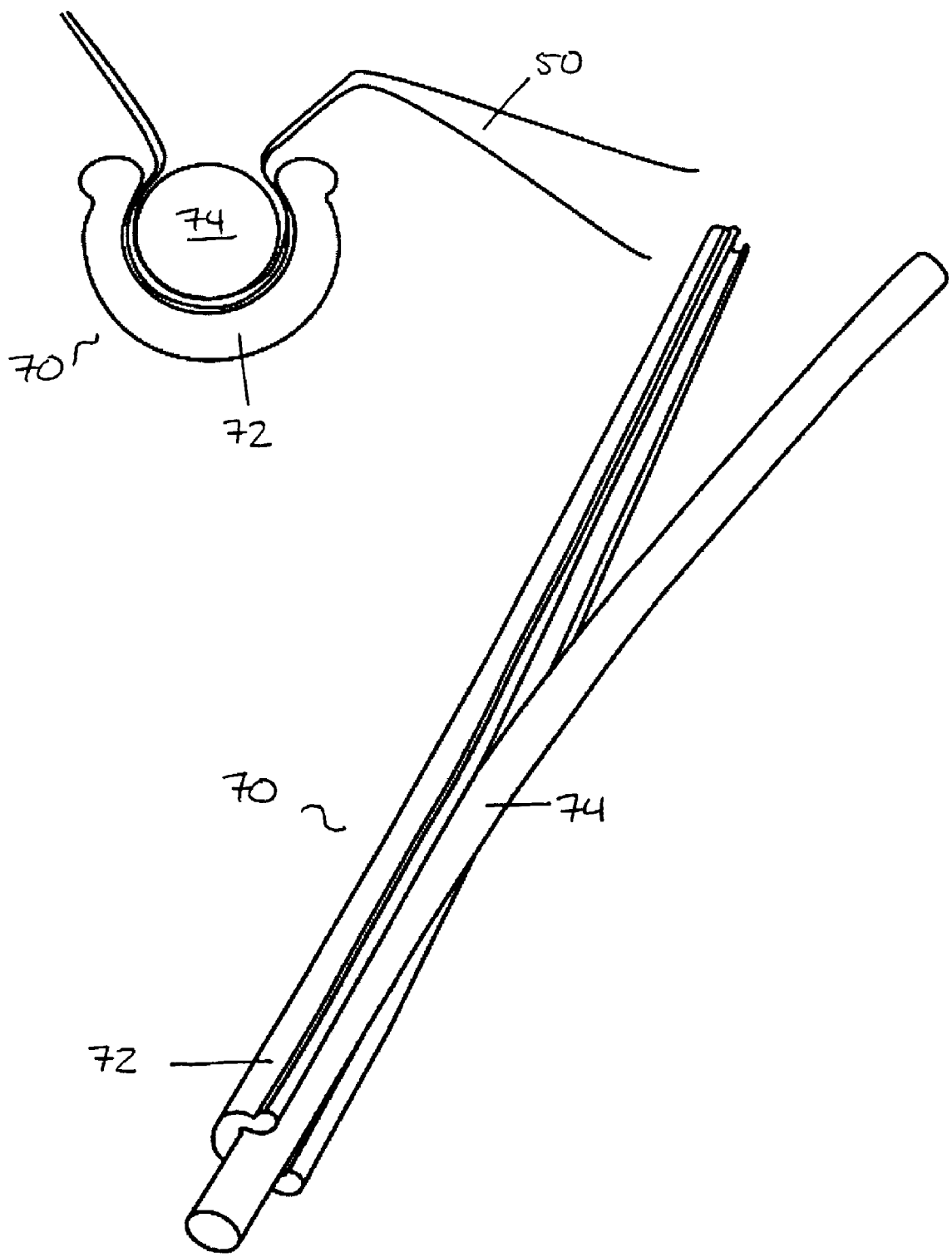
FIG. 5a is a perspective view of a preferred embodiment of the vacuum bag clip.
FIG. 5b is a cross-sectional view of the vacuum bag clip engaging the vacuum bag.

The remaining open end 62 of the container 50 may be sealed using a removable clamp 70, shown in FIGS. 5a and 5b, so that the container 50 may be used for the manufacture of subsequent decks 10. The clamp 70 comprises a cradle 72 and a rod 74 which fits in snap-fit relation into the cradle 72, each of which extend for at least the width of the container opening 62. To releasably seal the container 50, the end 62 of the container 50 is placed on the cradle 72, and the rod 74 is snapped into place in the cradle 72, thus securing the container 50 therebetween, as can be seen in FIG. 5b. The clamp 70 thus provides a releasable airtight seal for the opening 62. Alternatively, the open end 62 may be sealed using a resealable low-tack adhesive tape which also provides an airtight seal.

Figure 4:
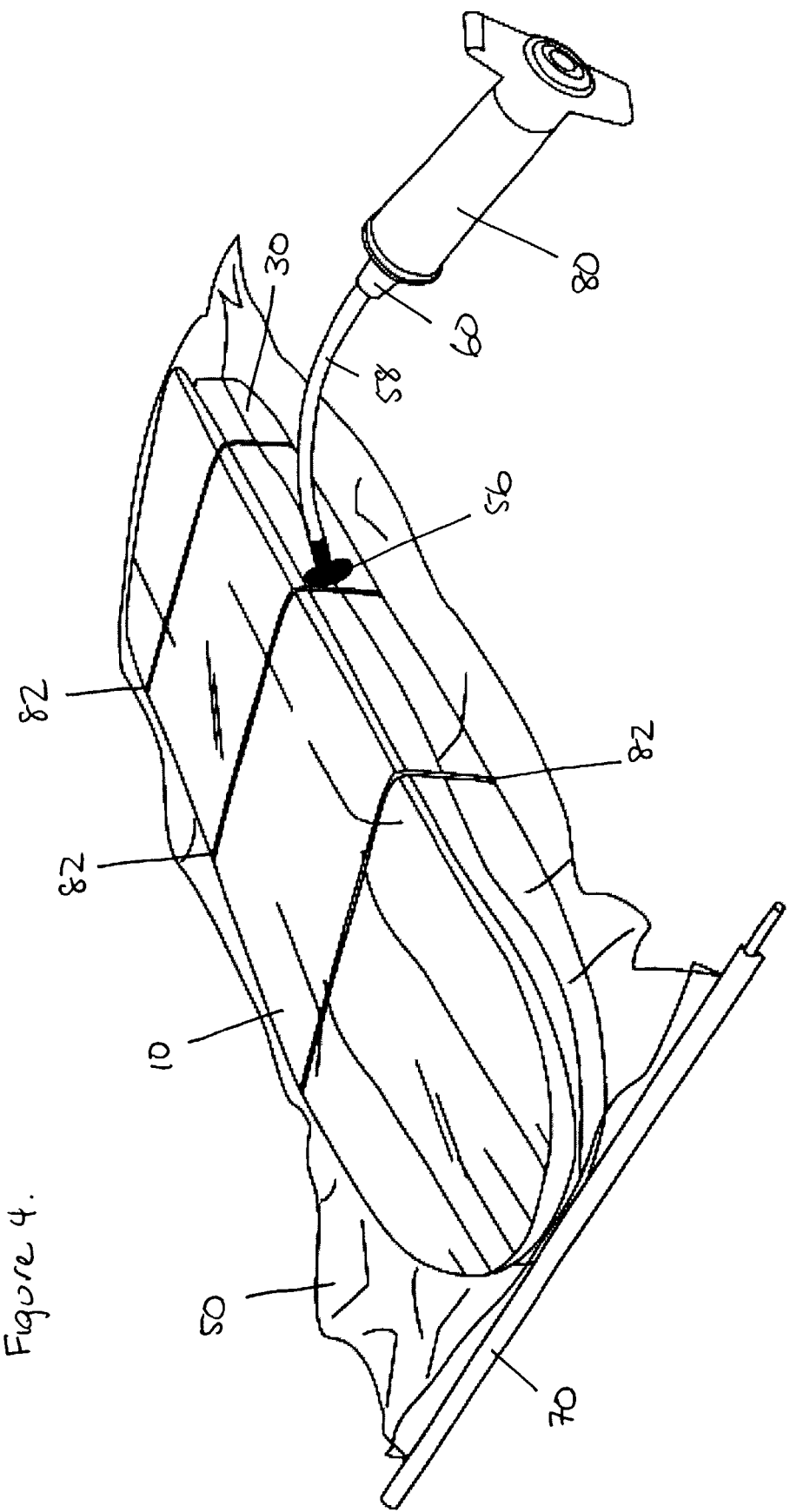
FIG. 4 is a perspective view of the mold-layer assembly and vacuum container with the air evacuated from the container.

In order to evacuate air from the sealed vacuum container 50, a vacuum pump means is used. As shown in FIG. 4, in the preferred embodiment an inexpensive hand pump 80 is mounted on the check valve 60 to evacuate the air, and is removed once the air is evacuated from the container 50. The check valve 60 prevents air leakage once the hand pump 80 is removed.

Thus, to assemble the skateboard deck 10, the layers 22a through 22g are stacked in the desired order for mounting on the mold 30, such that the first skate face layer 22a is mounted on the mold 30 first. A coating of adhesive is applied to the interior of the skate face layer 22a; this layer 22a is then mounted on the mold 30 with the adhesive-coated side facing up, such that the alignment holes 24, 26 are aligned on the alignment pins 32, 34. A coating of adhesive is then applied to the surface of the next layer, 22b, such that when the layer 22b is mounted on the mold 30 and aligned, the adhesive-coated surface again faces up, and the non-coated surface of the layer 22b contacts the adhesive-coated surface of the previous layer 22a. This process is followed for the remaining layers, except for the second skate face layer 22g. This last layer 22g is placed on the mold 30 and alignment pins 32, 34 without a final coating of adhesive.

The mold-layer assembly is then placed inside the vacuum container 50. Preferably, for added security against misalignment, the assembly may be temporarily secured with elastic bands or other tie fasteners 82 during the remainder of assembly. At this stage, the layers 22a through 22g are substantially unbent and do not conform to the contours of the surface 36 of the mold 30. The vacuum container 50 is sealed using the bag clamp 70 or other sealing means, and the air is evacuated through the aperture 56 by means of the vacuum pump 80 such that pressure is applied against the layers 22a through 22g and they conform to the contoured surface 36. Preferably, a pressure of approximately 26 Hg, which is effectively approximately 15 psi, is applied. By maintaining a vacuum within the container 50, the layers 22a through 22g will continue to be contoured against the mold 30. The adhesive is then allowed to set. If air inadvertently leaks into the container 50 while the adhesive is setting, the vacuum pump 80 may be temporarily reattached to evacuate the air.

Thus, the skateboard deck 10 is manufactured in the following process:

A mold and skate face, skate core, and x-band layers are provided. Adhesive is applied to the interior of a first skate face layer, and the first skate face layer is mounted on the mold with the adhesive-coated face up. Adhesive is then applied to subsequent layers on the face that will not be in contact with the glue from the previous layer mounted on the mold, and the subsequent layers are mounted in the appropriate order on the mold with the adhesive-coated side facing up, until the second skate face layer remains. This final layer is mounted on the mold without the application of additional adhesive. The layers are aligned on the mold either by means of alignment pins, or by temporarily fixing the layers in place using a removable restraint. The mold-layer assembly thus produced is placed in the vacuum container; the container is sealed, and air is evacuated to apply pressure to the mold-layer assembly and cause the layers to conform to the contours of the mold. The adhesive is allowed to set before the mold-layer assembly is removed from the vacuum environment and the deck is removed from the mold. The deck may then be finished, for example by smoothing the edges and decorating and sealing or finishing the surfaces of the deck. Skateboard hardware may then be attached.

Various embodiments of the present invention having been thus described in detail by way of example, it will be apparent to those skilled in the art that variations and modifications may be made without departing from the invention. The invention includes all such variations and modifications as fall within the scope of the appended claims.

I claim:

1. A method of manufacturing a skateboard comprising the steps of:
   providing a one-sided mold formed from foam having a contoured surface and a plurality of thin layers of veneer capable of conforming under pressure to the contoured surface;
   mounting the thin layers in stacked relation on the contoured surface of the mold, with an adhesive interposed at each contact point between the layers;
   placing the mold and thin layers stacked thereon in a flexible-walled environment from which air can be evacuated;
   evacuating air from the environment such that pressure is applied to the flexible-walled environment to an extent that the thin layers conform to the contoured surface; and
   permitting the adhesive to set before removing the thin layers from the environment and the mold to produce a skateboard deck comprising a plurality of thin layers without a substantially thicker core,
   wherein the air is evacuated from the environment by means of a hand vacuum pump.

2. The method of claim 1 wherein when the layers are mounted in stacked relation, they are aligned by means of alignment pins or elastic restraints.

3. The method of claim 1 further comprising the steps of finishing the edges and surfaces of the deck, and mounting the deck on skateboard hardware.

4. The method of claim 1 wherein the step of a one-sided mold having a contoured surface and a plurality of thin layers comprises the step of cutting the thin layers substantially in the shape of a skateboard deck prior to mounting the thin layers in stacked relation on the contoured surface of the mold.

5. The method of claim 4 wherein the step of cutting the thin layers comprises the step of providing holes in the thin layers for use in alignment of the thin layers on the mold and/or mounting hardware on the skateboard deck after the skateboard deck is removed from the mold.

6. The method of claim 1 wherein the step of providing a one-sided mold having a contoured surface and a plurality of thin layers comprises the step of providing a plurality of layers formed of wood veneer.

7. The method of claim 6 wherein the step of providing a plurality of layers formed of wood veneer comprises the step of cutting wood veneer substantially in the shape of a skateboard deck prior to mounting the thin layers in slacked relation on the contoured surface of the mold.

8. A method of manufacturing a skateboard deck from a plurality of thin layers of veneer capable of conforming to a contoured surface under pressure, comprising the steps of:
   providing a one-sided mold formed from foam having a contoured surface, a plurality of thin layers having approximately the same thickness, and a flexible-walled air-impermeable container provided with a valve means;
   mounting the thin layers in stacked relation on the contoured surface of the mold, with an adhesive interposed at each contact point between the layers;
   placing the mold and thin layers stacked thereon in the flexible-walled container and scaling said container;
   evacuating air from the container through the valve means such that pressure is applied to the container to an extent that the thin layers conform to the contoured surface; and
   permitting the adhesive to set before removing the thin layers from the container and the mold to produce a skateboard deck having a contoured surface,
   wherein the air is evacuated from the container by means of a hand vacuum pump attached to the valve means.

9. The method of claim 8 wherein when the layers are mounted in stacked relation, they are aligned by means of alignment pins or elastic restraints.

10. A method of manufacturing a skateboard deck comprising the steps of:
    providing a one-sided mold Conned from foam having a contoured surface, a plurality of layers of veneer capable or conforming under pressure to the contoured surface, and a flexible-walled air-impermeable container provided with a valve means;
    applying adhesive to a face of a first layer and mounting the first layer on the mold, such that the adhesive is exposed;
    applying adhesive to a face of a subsequent layer and mounting the subsequent layer on the previous layer on the mold, such that the adhesive of the subsequent layer is exposed;
    repeating the previous step with all but a final layer;
    mounting the final layer on the previous layer on the mold, such that the adhesive of the previous layer is in contact with a face of the final layer;
    placing the mold and layers mounted thereon in the container and sealing said container;
    evacuating air from the container through the valve means such that pressure is applied to the container to an extent that the layers conform to the contoured surface; and
    permitting the adhesive to set before removing the layers from the container and the mold to produce a skateboard deck having a contoured surface that does not require a core or spine that is substantially thicker than the layers,
    wherein the air is evacuated from the container by means of a hand vacuum pump attached to the valve means.

11. The method acclaim 10 wherein when the layers are mounted in stacked relation, they are aligned by means of alignment pins or elastic restraints.

* * * * *